United States Patent [19]
Berger et al.

[11] Patent Number: 5,787,744
[45] Date of Patent: *Aug. 4, 1998

[54] VANDAL-RESISTANT TORQUE SENSITIVE RELEASE MECHANISM WITH ANGULAR LIMIT

[75] Inventors: Simon Berger, Lido Beach; Peter Zoltan, Maspeth, both of N.Y.

[73] Assignee: Securitech Group, Inc., Maspeth, N.Y.

[*] Notice: The term of this patent shall not extend beyond the expiration date of Pat. No. 5,730,014.

[21] Appl. No.: 811,693

[22] Filed: Mar. 5, 1997

Related U.S. Application Data

[63] Continuation-in-part of Ser. No. 700,632, Aug. 16, 1996.

[51] Int. Cl.$^6$ .................................................. E05B 15/16
[52] U.S. Cl. ..................... 70/422; 464/39; 70/224; 292/350; 292/DIG. 27
[58] Field of Search ............... 70/422, 224, 222, 70/221; 81/4, 473, 474, 475, 480, 481; 464/36; 292/347, DIG. 27, 350, 348

[56] References Cited

U.S. PATENT DOCUMENTS

| | | | |
|---|---|---|---|
| 1,466,148 | 8/1923 | Sands . | |
| 1,516,152 | 9/1924 | Dumont | 464/39 |
| 1,899,996 | 3/1933 | Sullivan | 292/DIG. 27 |
| 1,910,125 | 5/1933 | Root | 464/39 |
| 2,469,601 | 5/1949 | Lee | 292/DIG. 27 |
| 2,797,564 | 7/1957 | Bonneau et al. | 81/475 |
| 3,016,724 | 1/1962 | Sussman | 464/36 |
| 3,314,708 | 4/1967 | Welch | 292/DIG. 27 |
| 3,662,628 | 5/1972 | Schnepel | 81/474 |
| 4,195,502 | 4/1980 | Best et al. | 70/224 |
| 4,517,865 | 5/1985 | Huang | 81/475 |
| 4,655,059 | 4/1987 | Best et al. | 70/224 |
| 4,773,240 | 9/1988 | Foshee | 70/224 |
| 4,941,697 | 7/1990 | Fan | 292/336.3 |
| 5,010,755 | 4/1991 | Best | 70/422 |
| 5,617,749 | 4/1997 | Park | 70/224 |
| 5,651,280 | 7/1997 | Park | 70/223 |

Primary Examiner—Darnell M. Boucher
Attorney, Agent, or Firm—Abelman, Frayne & Schwab

[57] ABSTRACT

A vandal-resistant torque sensitive release mechanism is disclosed for coupling and decoupling an actuating handle to a lock mechanism. The torque sensitive release mechanism is disclosed is in the form of a slip-clutch, with the rotational movement of the slip clutch being limited when excessive force is applied to prevent the actuating handle from moving to a position where it would interfere with the subsequent desired opening of the door.

15 Claims, 3 Drawing Sheets

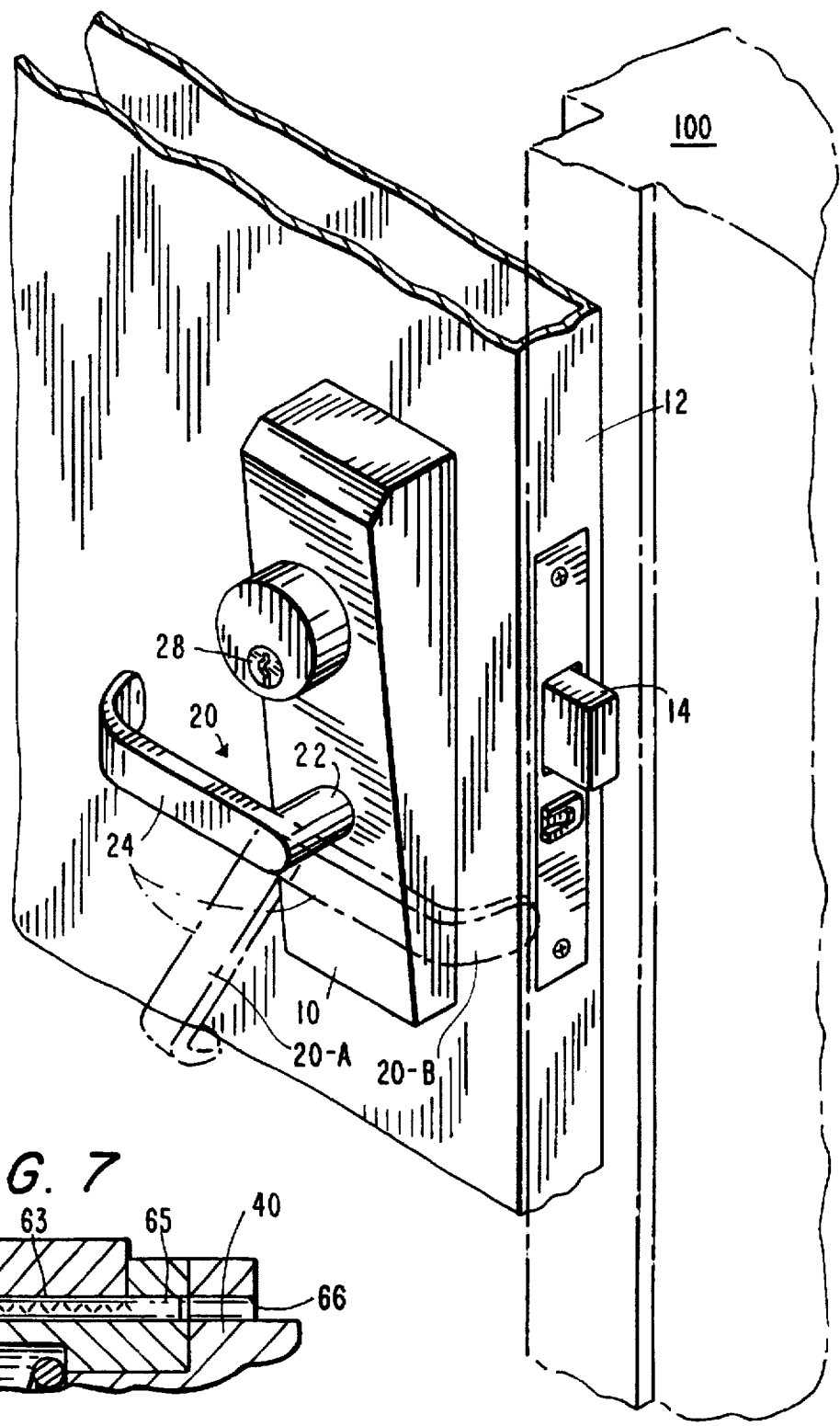

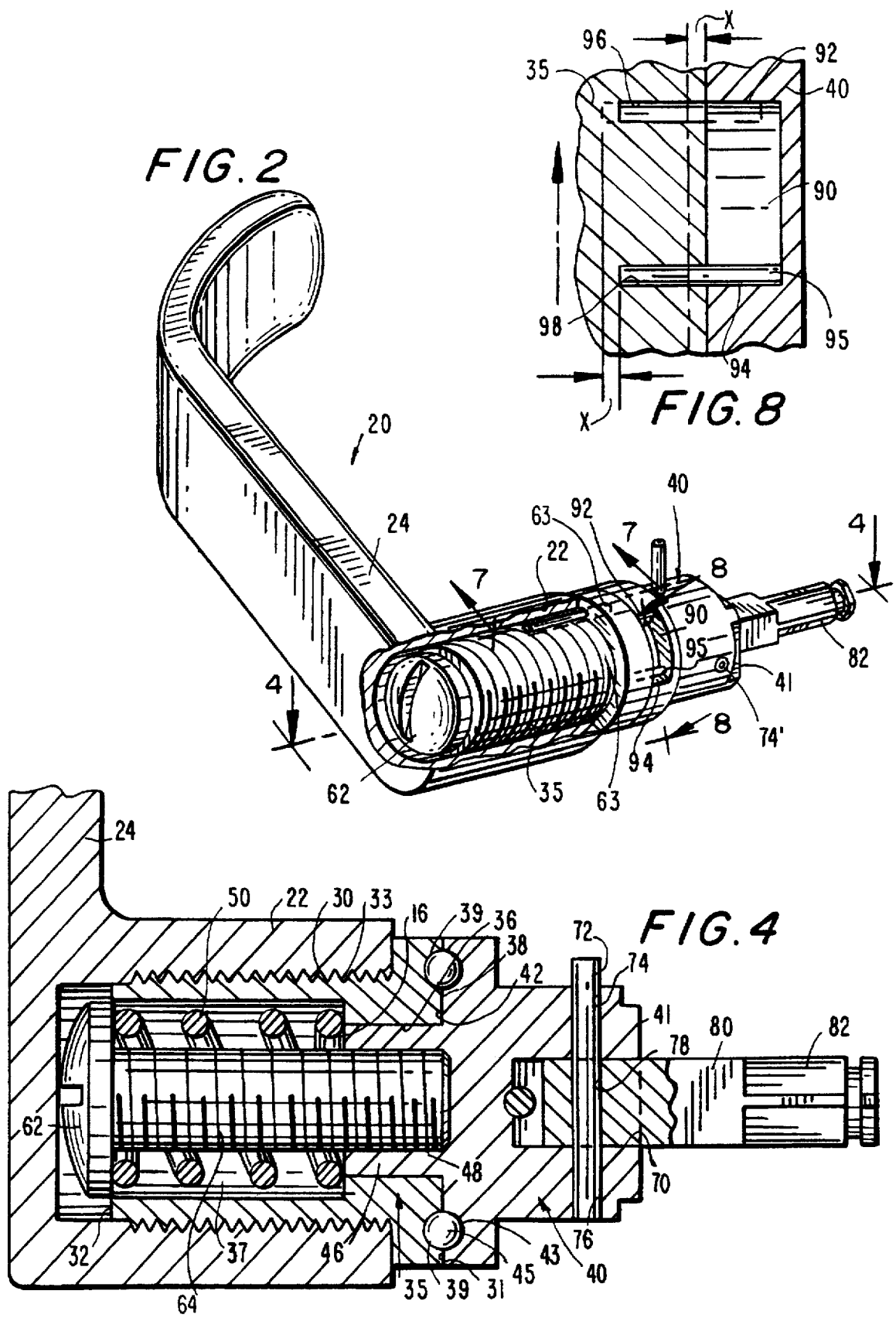

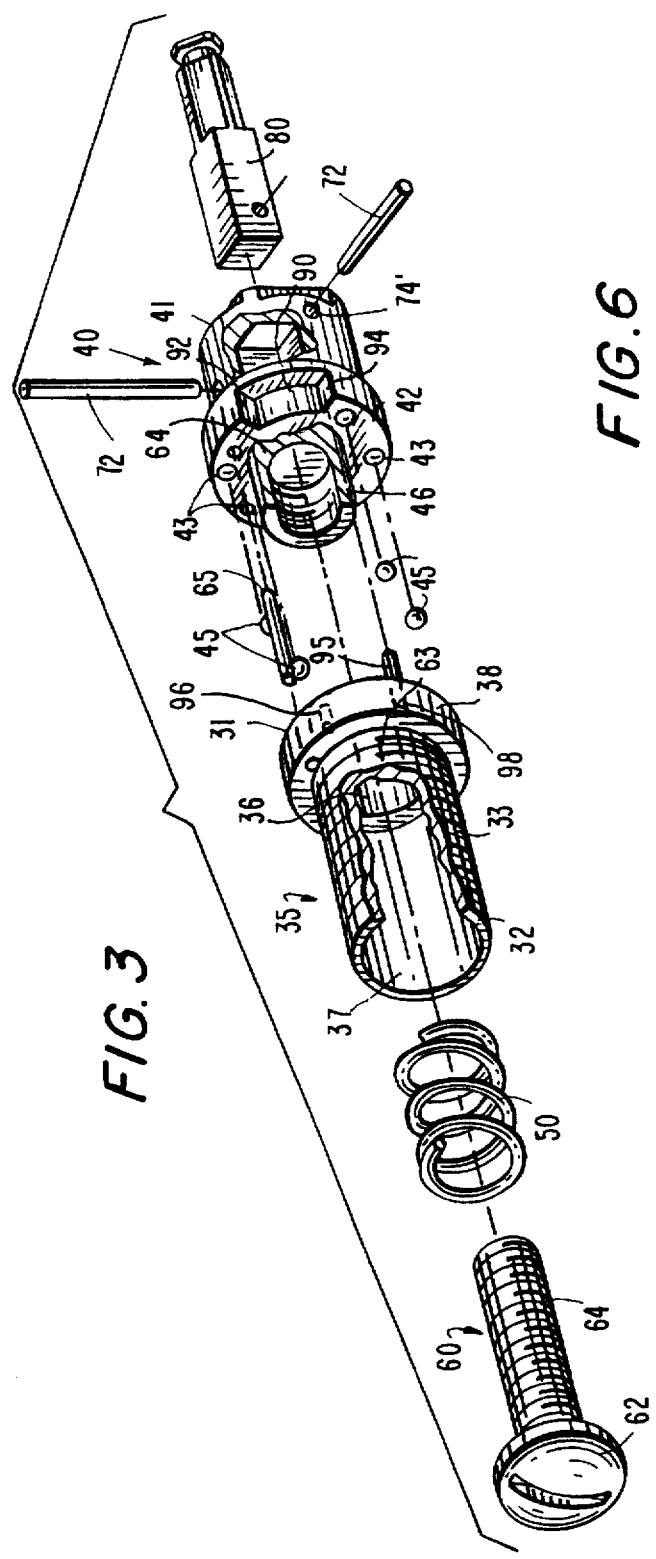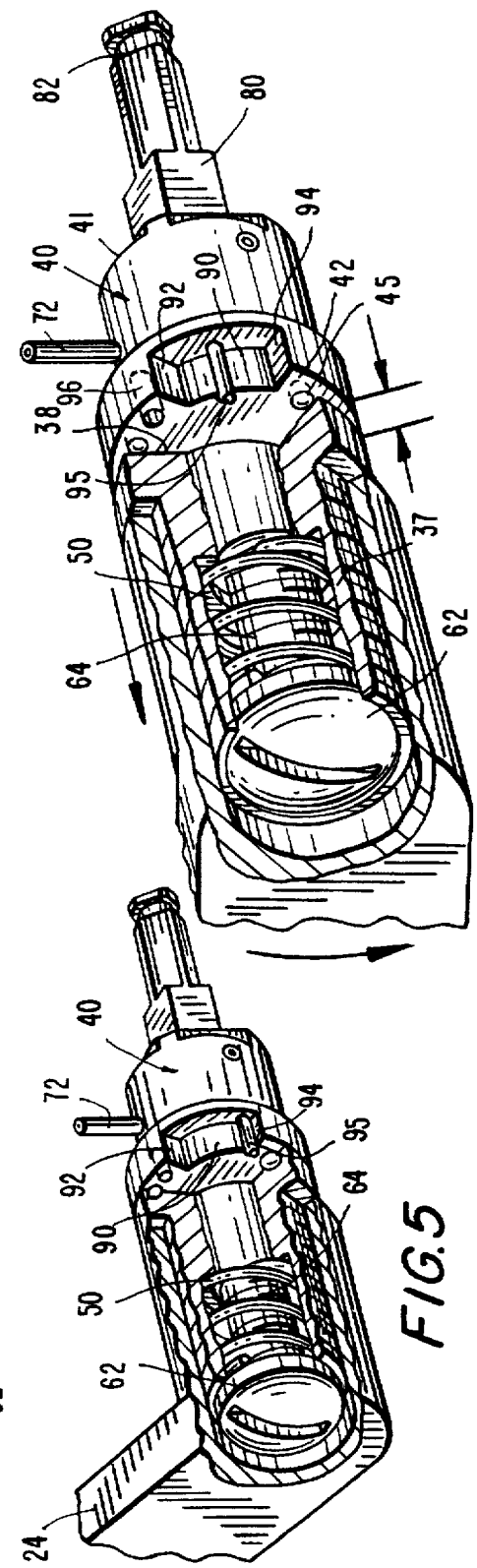

5,787,744

1

VANDAL-RESISTANT TORQUE SENSITIVE RELEASE MECHANISM WITH ANGULAR LIMIT

The present application is a Continuation-In-Part of Ser. No. 08/700,632 which was filed on Aug. 16, 1996.

FIELD OF THE INVENTION

The present invention relates to a vandal-resistant torque sensitive release mechanism for the coupling of lock to an actuating handle having an angular limit of operation. The torque sensitive release mechanism includes a slip clutch type of connection between the actuating handle and lock mechanism such that upon the application of excessive force the connection will be decoupled, thereby rendering the lock mechanism inoperable, without damaging the lock mechanism or any of the operating connecting members. The mechanism may be readily reset after the application of excessive force. A limiting means is included for limiting the rotational movement of the slip clutch upon the application of excessive force in order to prevent the actuating handle from moving to a position where it could interfere with the subsequent proper operation of the lock mechanism and opening of the door.

BACKGROUND OF THE INVENTION

The invention relates to a vandal-resistant torque sensitive release mechanism of the type shown in the aforementioned Ser. No. 08/700,632 which is utilized to couple and decouple a manually operable actuating handle to the lock mechanism. The torque sensitive release mechanism includes a slip clutch connection between the actuating handle and lock mechanism, with the clutch release force being predetermined such that upon the application of excessive force the actuating handle will be disconnected from the lock mechanism. Such torque sensitive release mechanisms had previously been shown in U.S. Pat. Nos. 4,195,502, 4,312,201, 4,550,581, 4,667,994, 4,773,240, 5,010,755. Other torque sensitive release mechanisms for applications other than in conjunction locks are shown in U.S. Pat. Nos. 1,232,779, 1,466,752, 3,136,400, 3,016,724.

Several disadvantages of these prior art devices have been successfully overcome in the mechanism of prior application Ser. No. 08/700,632 which includes a pair of cylindrical members having opposed annular faces which are coupled together by a slip clutch structure. The slip clutch structure includes an equal plurality of arcuately spaced semi-hemispherical depressions which are in opposed relationship in the annular wall surfaces. A spherical ball connector is located in each of the opposed depressions, with the annular surfaces being biased into coupling engagement by a suitably calibrated compression spring. One of the cylindrical members is coupled to the actuating handle, and the other cylindrical member is coupled to the lock mechanism. Upon proper operation of the assembly, rotational movement of the actuating handle is coupled to the lock mechanism while the spherical ball connectors are in their opposed depressions within the slip clutch structure. Should an attempt be made to incorrectly release the lock, with excessive force being applied to the actuating handle, the spherical ball connectors will slip out of their opposed depressions thereby decoupling the actuating handle from the lock mechanism to prevent vandalized operation of the lock mechanism. Unless the extent of slip clutch movement is limited, the cylindrical members will rotate with respect to each other until the spherical ball connectors move into the next set of opposed depressions, thereby again coupling the actuating handle to the lock mechanism. Should repeated attempts be made to vandalize the lock mechanism, with the slip clutch successively decoupling and coupling the actuating handle to the lock mechanism, the actuating handle can rotate to a position where, upon subsequent proper operation of the mechanism it could interfere with the proper opening of the door containing the lock mechanism.

SUMMARY OF THE INVENTION

In order to prevent operation of the slip clutch from interfering with the subsequent proper operation of the lock mechanism, the present application provides for the addition of a limiting means. The limiting means limits the relative movement between the clutch surfaces to a predetermined amount when a force is applied to the actuating handle which exceeds the compression spring force and the slip clutch surfaces are decoupled. This limiting means is provided by a relatively simple and inexpensive modification of the mechanism which is the subject of aforementioned U.S. Ser. No. 08/700,632. Specifically, an arced notch is cut out from the periphery of the slip clutch member which is connected to the lock mechanism. The arcuate extent of the notch is less than the arcuate spacing between successive slip clutch engagement (as provided by the opposed semi-hemispherical depressions for the reception of the spherical ball connectors). The slip clutch member connected to the actuating handle receives a pin which axially extends into the aforementioned arcuate notch. The pin will typically be formed of steel, as are the two cylindrical members forming the slip clutch mechanism. Accordingly, upon the application of a rotational force to the actuating handle which exceeds the compression spring force of the slip clutch, the slip clutch will decouple permitting the cylindrical member connected to the actuating handle to rotate with respect to the cylindrical member connected to the lock mechanism. Such rotation, which in U.S. Ser. No. 08/700,632 had continued until subsequent rotational engagement of the slip clutch, will now be stopped when the pin of the limiting means, which is connected to one of the slip clutch cylindrical members, contacts the end wall of the arcuate notch in the other slip clutch member. The force to- overcome this contact, which would require fracture of the steel pin, is substantially greater than the compression spring force of the slip clutch mechanism, and is not readily manually obtainable.

In the applicants preferred embodiment, where the slip clutch is formed of four orthogonally separated semi-hemispherical depressions in each of the opposed surfaces of the slip clutch mechanism, the limiting means provided by the present invention would permit arcuate movement, upon slip clutch decoupling, of an amount in the order of forty-five to sixty-five degrees (45° to 65°). Accordingly, the slip clutch could not move to the next position, which would require ninety degrees (90°) of relative rotation. Hence, rather than successively moving the actuating handle to the next successive slip clutch position upon the decoupling of the slip clutch, the actuating handle will be returned (by movement in the opposite rotational direction) to its initial position. Accordingly, the limiting means of the present invention prevents the actuating handle, upon decoupling of the slip clutch, to move to a position where it could interfere with the subsequent opening of the door upon proper operation of the lock mechanism.

Accordingly, it is a primary object of the present invention to provide a limiting means in conjunction with a vandal-resistant torque release mechanism for limiting the degree of actuating handle movement upon actuation of the slip clutch to decouple the actuating handle from the lock mechanism.

A further object of the present invention is to provide such a vandal-resistant torque sensitive release mechanism, in which the force to overcome the limiting means is substantially greater than the operating force of the slip clutch mechanism which decouples the actuating handle from the lock mechanism.

Another object of the present invention is to provide for the ready retrofit of applicants' prior torque sensitive release mechanism to limit the rotational movement of the actuating handle upon the application of successive forces.

These as well as other objects and advantages of the present invention are depicted in the following drawings and described with reference to a preferred embodiment.

BRIEF DESCRIPTION OF THE DRAWINGS

FIG. 1 is a perspective view generally showing an environment for the installation of the vandal-resistant torque sensitive release mechanism of the present invention.

FIG. 2 is a partially cut away perspective view of the vandal-resistant torque sensitive release mechanism in conjunction with the actuating handle.

FIG. 3 is an exploded view of the components forming the torque sensitive release mechanism, and including the connecting spindle to the lock mechanism.

FIG. 4 is a cross sectional view of the assembled torque sensitive release mechanism, shown in the operating torque transmitting condition.

FIG. 5 is a partially cut away perspective view corresponding to the condition of FIG. 4.

FIG. 6 is a perspective view of the vandal-resistant torque sensitive release mechanism shown after being subjected to excessive force, with the torque transmitting components being decoupled and the limiting means at its angular limit.

FIG. 7 is a sectional view as shown by the arrows 7—7 of FIG. 2.

FIG. 8 is a sectional view as shown by the arrows 8—8 of FIG. 2.

Referring initially to FIG. 1, the operating lock mechanism lever handle unit 10 is installed in door 12, and is connected to a lock mechanism which preferably includes a deadbolt 14 for engagement with a cooperating recess within the door jamb 100. The lever handle unit 10 is operated by actuating handle 20 which includes a cup like portion 22 and a manual operating handle 24. In the well known manner, a key is inserted into recess 28 and rotated to permit the appropriate rotation of manual handle 24 to operate the lock mechanism 10, via the vandal-resistant torque sensitive release mechanism discussed below in conjunction with FIG. 2–8. More specifically, should the proper key not be inserted within recess 28 and rotated, actuating handle 20 should not be able to operate the lock mechanism 10. In the event excessive force is applied to the actuating handle 20, as by a tampering attempt, there will be a decoupling between actuating handle 20 and lock mechanism 10, so as to prevent undesired opening of the lock mechanism 10 without damage to any of the operating components.

During such decoupling between the actuating handle and the lock mechanism, the actuating handle 20 will continue to rotate in a counterclockwise direction, as shown in the dotted condition 20-A without corresponding movement of the lock mechanism. In accordance with the present invention, such counterclockwise rotational movement of the operating handle while it is decoupled from the lock mechanism is limited so that it cannot go to the condition shown dotted in FIG. 1 as 20-B where it would then interfere with proper operation of the lock mechanism upon the insertion of a key within recess 28.

Reference is now made to FIGS. 2–5 which show the torque sensitive release mechanism in the operative, or coupled position. The cup like portion 22 of actuating handle includes an internal screw thread 30 for threaded engagement with the slip-clutch type torque sensitive release mechanism. The torque sensitive release mechanism includes a first cylindrical member 35 having opposed first end 31 and second end 32. An external screw thread 33 extends from adjacent end 32 towards end 31. External screw thread 33 is of a pitch and length to engage to the internal thread 30 of the actuating handle. The first cylindrical member 35 includes an interior chamber extending between its opposed ends 31–32, with a first compartment 36 communicating with end 31, and a second compartment 37, communicating with end 32. An interior shoulder 16 divides the interior chamber into the compartments 36–37. An annular wall 38 at the end 31 includes a plurality of arcuately spaced generally semi-hemispherical detent depressions 39. In the particular embodiment shown herein, four such depressions 39 are shown, orthogonally spaced, an equal distance from the axis of cylindrical member 35. It should however, be understood that a different number of such depressions may be provided which should however, be equally arcuately spaced about annular wall 38.

A second cylindrical member 40 is an axial alignment with the first cylindrical member and includes a first end 41 and second end 42. End 42 includes a plurality of arcuately spaced generally semi-hemispherical depressions 43 which correspond, and are complimentary to, depressions 39 in the annular wall 38 of the first cylindrical member 35. An individual spherical ball bearing type element 45 is placed in each of the opposed generally semi-hemispherical depression 39–43 in opposed annular walls 38–42. The second cylindrical member further includes a reduced diameter boss 46 which is located within, and of a length generally corresponding to the first internal compartment 36 of the first cylindrical member 35. The outer diameter of boss 46 generally corresponds to, but is slightly less than the internal diameter of compartments 36, so as to provide a snug fit therein. Boss 46 includes an internal thread 48.

A compression spring 50 is located within the second compartment 37 of the first cylindrical member 35. Compression 50 is of a length substantially corresponding to the length of internal compartment 37, and has an outer diameter substantially corresponding, but slightly less than, the interior diameter of compartment 37, so that spring 50 may be snugly contained therein. A connecting bolt 60 having a head portion 62 and an external threaded shank 64 extends through the interior of the compression spring 50, and threadedly engages the internal thread 48 of the boss 46. Hence the threaded engagement of the connecting bolt 60 and boss 46 compress the coil spring 50 with a predetermined force to urge the annular walls 38, 42 together through the cooperative connection of the plurality of arcuately spaced spherical ball connectors 45. It should further be understood that the application of a predetermined excessive force will defeat this engagement, thereby disconnecting the cylindrical members 35 and 40.

A pair of aligned apertures 63 and 66, are advantageously provided on opposed shoulders of the slip clutch members 35 and 40. After members 35 and 40 are assembled and threadably inserted within the threaded bore 30 of the operating handle cup-like portion 22, a pin 65 is then inserted through aligned openings 63,66. The pin 65 is then appropriately depressed completely through the opening 66. Pin 65 is of a predetermined length such that, as a result of such inward depression, its forward end will fracture several of the uppermost screw threads 30, as shown in FIG. 7. This serves to provide an increased secure engagement between the slip clutch assembly 35-40 and operating handle 20. However, should it be desired to remove the slip clutch assembly for replacement, pin 65 may then be drilled out. Thereafter, upon the application of appropriate rotational force, the slip clutch assembly is threaded outward from the operating handle.

The end 41 of the second cylindrical member 40 is adapted to be connected to the lock mechanism (the details of which are not shown). As is well known, such a lock mechanism may either include an externally extending spindle, usually of square cross section, an opening adapted to receive such a spindle, or have a threaded or other suitable intermediate connector. In order to enhance the universality of my torque sensitive release mechanism it is designed to accommodate any such connection to the lock mechanism. One such typical connection is shown in the present embodiment. More specifically, extending inward from end 41 is an internal connecting bore 70, which is of a square cross section. Bore 70 extends toward the terminus of the internally threaded opening 48. The internal connecting bore 70 is configured to receive the connecting spindle 80 of a particular type of lock mechanism. The connection therebetween is made via a pin 72 which extends between openings 74-76 on opposed walls of the internal connecting bore, and opening 78 extending transversely through connecting spindle 80. Advantageously, two such paths for the reception of pin 72 are provided at opposed walls of the internal connecting bore 70, with the other set of openings being shown as 74', 76'. Hence, by selecting which of the pin paths (74-76, or 74'-76') is to be utilized for connections to spindle 80, we calibrate the operative force for defeating the biasing provided by compression spring 50.

Spindle 80 may be a separate member with its opposite end 82 appropriately shaped to connect with the lock mechanism. Alternatively, where the lock mechanism includes such a spindle, spindle 80 would be integral with the lock mechanism.

In accordance with the present improvement, an arcuate notch 90 having opposed end walls 92,94 is provided along the outer periphery of cylindrical member 40. A pin 95, preferably formed of steel, is inserted within an axial bore 98 of cylindrical member 35, such that in the operative coupled position, as shown in FIG. 5, the pin 95 will preferably be positioned at end wall 94 of the notch 90.

Reference is now made to FIG. 6 which shows the disengagement of the torque sensitive release mechanism, with spherical members 45 slipping out of their cooperating detents 39-43 upon the application of a predetermined excessive force. In this situation, the cylindrical members 35 and 40 are decoupled and hence the manual turning of actuating handle 20 will be decoupled from the lock mechanism, thereby preventing tampering, as well as destruction of the lock mechanism.

Hence, as cylindrical member 35 rotates counterclockwise while cylindrical member 40 is stationary, the pin 95 will move within the notch 90, as shown in FIG. 6, with such movement being limited by the engagement of pin 95 and end wall 92 of the notch 90. In order to overcome the restraining force of the limiting means provided by pin 95 and notch 90, the pin would have to be fractured. Since pin 95 is preferably formed of steel, this force is substantially greater than the force of the compressions spring for decoupling members 35 through 40, and is not readily manually obtainable. FIG. 8 shows details of the limiting means provided by pin 95 inserted with an axial bore 98 of the cylindrical member 35, and extending into notch 90 provided in cylindrical member 40, with the displacement "X" showing the axial movement of the slip clutch mechanism during decoupling. Preferably, an additional axial bore 96 is provided within the cylindrical member 35 for repositioning of the pin 95 upon a modified orientation of the slip clutch, lock mechanism and its actuating handle with respect to the door mounting. In the embodiment shown herein, four sets of semi-hemispherical depressions are provided. Hence, each coupling engagement of the slip clutch is separated by ninety degrees (90°). Accordingly, the translation of pin 95 within notch 90 would typically permit relative rotation in the order of forty-five degrees to sixty-five degrees (45° to 65°). Most importantly, the relative rotation between cylinders 35 and 40 must be less than the arcuate displacement between the clutch coupled positions (ie., ninety degrees (90°) in the present embodiment) so as to prevent successive decoupling and coupling of the slip clutch to move the operating handle to the position shown as 20-B in FIG. 1.

After an attempt is made to improperly activate the lock mechanism, resulting in the decoupling of the slip clutch cylindrical members 35,40, the actuating handle will then be moved clockwise back to its original position as shown in FIG. 1, wherein the proper insertion of a key within recess 28 permits the acceptable operation of the lock mechanism, devoid of any interference occasioned by the intervening decoupling of the cylindrical members 35,40 in response to the application of an excessive force to the actuating handle 20.

Accordingly, we have provided an improved vandal-resistant torque sensitive release mechanism for coupling and decoupling an actuating handle to a lock mechanism, wherein the decoupling of the lock mechanism does not interfere with subsequent proper operation.

It should be appreciated that other modifications and variations are anticipated within the spirit and scope of the following claims, which define the scope of our invention.

What is claimed is:

1. In a vandal-resistant torque sensitive release mechanism for coupling and decoupling an actuating handle to a lock mechanism, including a slip clutch mechanism between the actuating handle and lock mechanism;

said slip clutch mechanism including a first member for connection to an actuating handle and a second member for connection to a lock mechanism;

said first member including a first clutch surface and said second member including a second clutch surface;

biasing means urging said first and second clutch surfaces together with a first predetermined force such that said first and second members are cooperatively engaged to move in unison to transfer rotational movement of the actuating handle to the lock mechanism upon the application of a force which does not exceed said first predetermined force with the cooperative engagement between said first and second clutch surfaces being defeated upon the application of a force to the actuating handle which exceeds said first predetermined force, such that said first and second clutch surfaces move relative to each other and the actuating handle will be decoupled from the lock mechanism; and limiting means for limiting the relative movement between said first and second clutch surfaces to a predetermined amount when a force is applied to the actuating handle which exceeds said first predetermined force;

the improvement comprising:

said limiting means is between said first and second members and presents a blocking force of a second predetermined value for preventing relative movement between said first and second clutch surfaces in excess of said predetermined amount, with said second predetermined force substantially exceeding said first predetermined force.

2. In a vandal-resistant torque sensitive release mechanism according to claim 1, wherein, said first predetermined force is provided by a compression spring between said first and second members, and said second predetermined force is provided by a pin extending between said first and second clutch surfaces.

3. In a vandal-resistant torque sensitive release mechanism according to claim 2, wherein said pin is formed of steel.

4. In a vandal-resistant torque sensitive release mechanism according to claim 2, wherein a first of said clutch surfaces including an aperture for receiving a first end of said pin, the second of said clutch surfaces including an annular notch, with the second end of said pin freely extending into said notch, the arcuate extent of said notch defining said predetermined amount of relative movement permitted by said limiting means when a force exceeding said first predetermined amount is applied to the actuating handle.

5. In a vandal-resistant lock mechanism according to claim 1, 1 wherein:

said slip clutch mechanism includes a plurality of arcuately spaced seats for the cooperative engagement of said first and second clutch surfaces;

the application of a rotational force to said first member in excess of said first predetermined force defeating a first of said cooperative seats between said first and second clutch surfaces, and rotationally moving said first clutch surface relative to said second clutch surface to the next successive seat between said first and second clutch surfaces;

and said predetermined amount being less than the arcuate spacing between successive seats, whereby said limiting means prevents the cooperative engagement of said first and second clutch surfaces at the next successive seat.

6. In a vandal-resistant lock mechanism according to claim 5, wherein:

said seats comprising an equal plurality of opposed arcuately spaced semi-hemispherical depressions in each of said first and second clutch surfaces, and a spherical ball connector in each of the opposed depressions.

7. In a vandal-resistant lock mechanism according to claim 6, wherein:

each of said first and second clutch surfaces including four semi-hemispherical depressions such that successive depressions are arcuately spaced by ninety degrees (90°), and said predetermined amount is less than ninety degrees (90°).

8. In a vandal-resistant lock mechanism according to claim 7, wherein:

said predetermined amount is in the order of forty-five to sixty-five degrees (45° to 65°).

9. In a vandal-resistant torque sensitive release mechanism for coupling an actuating handle to a lock mechanism, comprising:

a first cylindrical member having first and second ends, an interior chamber extending between said first and second ends, a first annular wall at said first end, an interior shoulder within said interior chamber dividing said interior chamber into first and second compartments, said first compartment extending from said first end to said interior shoulder, and said second compartment extending from said second end to said interior shoulder, said first compartment being of lessor diameter than said second compartment;

a second cylindrical member in axial alignment with said first cylindrical member and having first and second ends, a second annular wall recessed from said second end of said second cylindrical member, said first end of said second cylindrical member including connecting means for connecting said second cylindrical member to a lock mechanism;

a cylindrical boss on said second cylindrical member including an integrally threaded central opening extending between said second annular wall and said second end, said boss being of lesser diameter than said second annular wall, and having an outer diameter less than the inner diameter of said first compartment, and a length corresponding to the length of said first compartment, such that said boss of said second cylindrical member is contained within said first compartment of said first cylindrical member; and a compression spring mounted in said second compartment, having first and second ends and an outer diameter less than to the inner diameter of said second compartment, such that said compression spring is contained in said second compartment, said first end engaging said interior shoulder;

each of said first and second annular walls including an equal plurality of arcuately spaced semi-hemispherical depressions which are in an opposed relationship;

a spherical ball connector in each of the opposed depressions in said annular walls;

a connecting bolt having a head portion and an externally threaded shank, said head contacting said second end of said coil spring, and said externally threaded shank extending through said coil spring and threadedly engaging said internally threaded central opening of said boss;

the threaded engagement of said connecting bolt and boss compressing said coil spring with a predetermined force to urge the first and second annular walls together through cooperative connection of said plurality of spherical ball connectors, with the application of a predetermined excessive force defeating said cooperative connection to disconnect said first cylindrical member from said second cylindrical member and lock mechanism, the improvement comprising:

limiting means for limiting the rotational movement between said first and second annular walls to a predetermined amount upon the application of a predetermined excessive force which defeats the cooperative engagement of said first and second cylindrical members.

10. In a vandal-resistant torque sensitive release mechanism according to claim 9, wherein:

said predetermined amount being less than the arcuate spacing between successive ones of said semi-hemispherical depressions.

11. In a vandal-resistant torque sensitive release mechanism according to claim 10, wherein:

each of said first and second annular walls include four orthogonally spaced semi-hemispherical depressions and said predetermined amount is in the order of forty-five to sixty-five degrees (45° to 65°).

12. In a vandal-resistant torque sensitive release mechanism according to claim 9, wherein:

said limiting means comprises a pin carried by said first annular wall and axially extending towards said second annular wall;

an arcuate notch within said second annular wall for receiving the free end of said pin;

said arcuate notch of predetermined extent having first and second end walls;

the free end of said pin contacting one of said end walls when the rotational movement between said first and second annular walls reaches said predetermined amount, with the contacting of said pin and end wall preventing further rotational movement between said first and second annular wails.

13. In a vandal-resistant torque sensitive release mechanism according to claim 12, wherein:

said predetermined amount being less than the arcuate spacing between successive ones of said semi-hemispherical depressions.

14. In a vandal-resistant torque sensitive release mechanism according to claim 13, wherein:

each of said first and second annular walls includes four orthogonally spaced semi-hemispherical depressions and said predetermined amount is in the order of forty-five to sixty-five degrees (45° to 65°).

15. In a vandal-resistant torque sensitive release mechanism according to claim 12 wherein:

said pin is formed of steel.

* * * * *